United States Patent [19]
Jarman

[11] 3,866,498
[45] Feb. 18, 1975

[54] LIGHT DUTY STACKER

[76] Inventor: David J. Jarman, Box 181, R.R. 3, Aurora, Ind. 47001

[22] Filed: July 30, 1973

[21] Appl. No.: 383,666

[52] U.S. Cl............................. 83/89, 83/90, 83/94, 83/104, 83/106, 83/165, 83/166
[51] Int. Cl....................... B65h 29/26, B65h 35/04
[58] Field of Search.......... 83/89, 90, 94, 104, 106, 83/165, 166; 271/86, 87, 88, 89

[56] References Cited
UNITED STATES PATENTS

| 253,986 | 2/1882 | Dannals | 83/89 |
| 1,920,999 | 8/1933 | Murch | 83/89 X |
| 2,307,594 | 1/1943 | Lee | 83/89 |
| 3,555,946 | 1/1971 | Addis | 83/89 |
| 3,670,611 | 6/1972 | Jarman | 83/89 X |

Primary Examiner—Frank T. Yost
Attorney, Agent, or Firm—Alter Weiss Whitesel & Laff

[57] ABSTRACT

A light duty stacking assembly for use in conjunction with shears. The assembly includes a conveyor portion and a sheared material stacking portion. The conveyor portion utilizes the force of gravity for moving the sheared material to the stacking portion. Thus, the conveyor of the light duty stacking assembly does not need motor driven belts, chains or the like. The conveyor portion includes an automatically operated scrap separator. The stacking portion provides means for stacking the sheared material into orderly stacks that can be readily moved from the stacker assembly for further processing or shipment as finished products.

6 Claims, 3 Drawing Figures

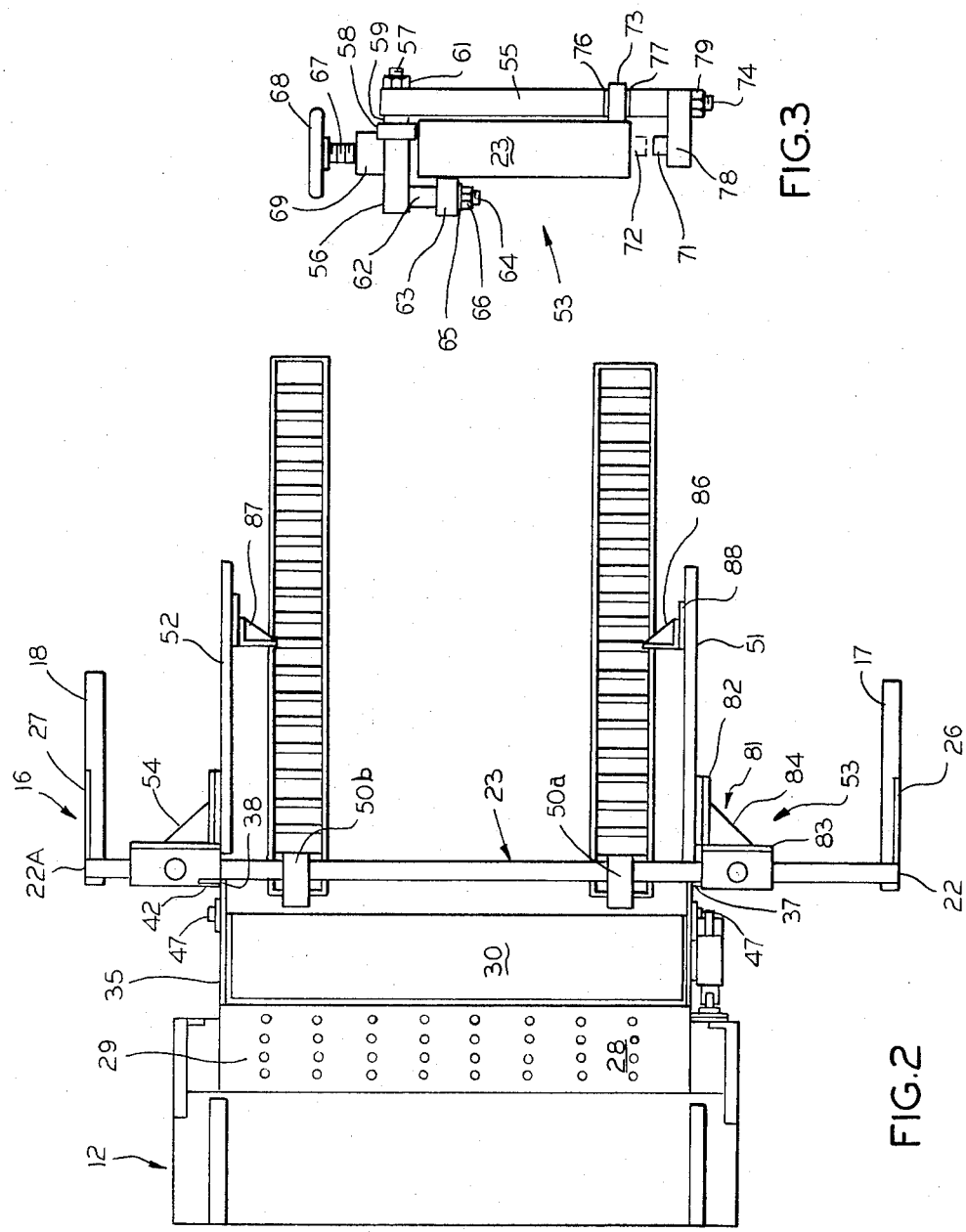

LIGHT DUTY STACKER

This invention relates to stacking assemblies, and more particularly to stacking assemblies for use with squaring shears or the like.

There are many different types of stacking assemblies presently available for use with squaring shears. The function of the stacking assemblies is to transport the sheared material from the rear of the shear to an intermediate storage position where the sheared material is stacked according to its size and shape.

The known shear discharge stacking assemblies utilize either motor driven belts or chains to transport the sheared material as it comes off of the shear blade to a stacking position. Difficulties arise due to malfunctioning of the motors used in driving the removable conveyor devices. In addition, the motor driven conveyor arrangements for the conveyors adds significantly to the noise level in the metal working plants where the shears are located.

Accordingly, an object of this invention is to provide new and unique shear discharge conveying and stacking systems.

A related object of this invention is to provide shear discharge conveying and stacking systems wherein the conveying portions of the systems do not utilize moving belts, tracks or the like.

Yet another object of this invention is to provide shear discharge conveying and stacking systems wherein the conveyor portion of the systems utilizes the force of gravity to provide the impetus necessary to move the sheared material from the back of the shears to the material stacks.

Yet another object of this invention is to provide movable back stops at the stacking portion of the shear discharge conveying and stacking systems wherein the back stops in the "down" position stop the sheared piece parts coming from the conveyor portion; and, the back stop in the "raised" position enables moving the stack from the foot of the conveying portion to a point of transportation or other processing point.

Yet another object of this invention is to provide conveyors using the force of gravity for moving the cut material and still enabling the automatic separation of scrap from usable material.

Yet another object of this invention is to provide light duty conveying and stacking systems that are portable, easy to use and efficient in operation.

A preferred embodiment of the shear discharge conveying and stacking system comprises a portable truck assembly having spaced apart standards thereon. Biased from the standards and extending to the shear is the conveyor portion of the apparatus. A horizontal member extends between the standards and across the back of the shear. Also, attached to the horizontal member are side plates for supporting back stops. Means are provided for positioning the back stops in the vertical position to stop the sheared materials as they fall from the conveyor portion. The back stops also have a horizontal position. In the horizontal position the back stop implements moving the stacking material away from the stacking portion of the apparatus.

Means are provided for automatically separating the scrap from the sheared material, placing the scrap into a scrap wagon, and guiding the sheared material onto stacks. Tamping means may be provided to enable tamping the stacks as the material is added to the stack to thereby provide stacks having even sides.

The above mentioned and other features and objects of this invention and the manner of obtaining them will become more apparent and the invention itself will be best understood by making reference to the following description of the preferred embodiment of the invention taken in conjunction with the accompanying drawings, wherein:

FIG. 2 is a plan view of the system of FIG. 1; and

FIG. 3 is a side view of a saddle rail assembly.

Figure 1:
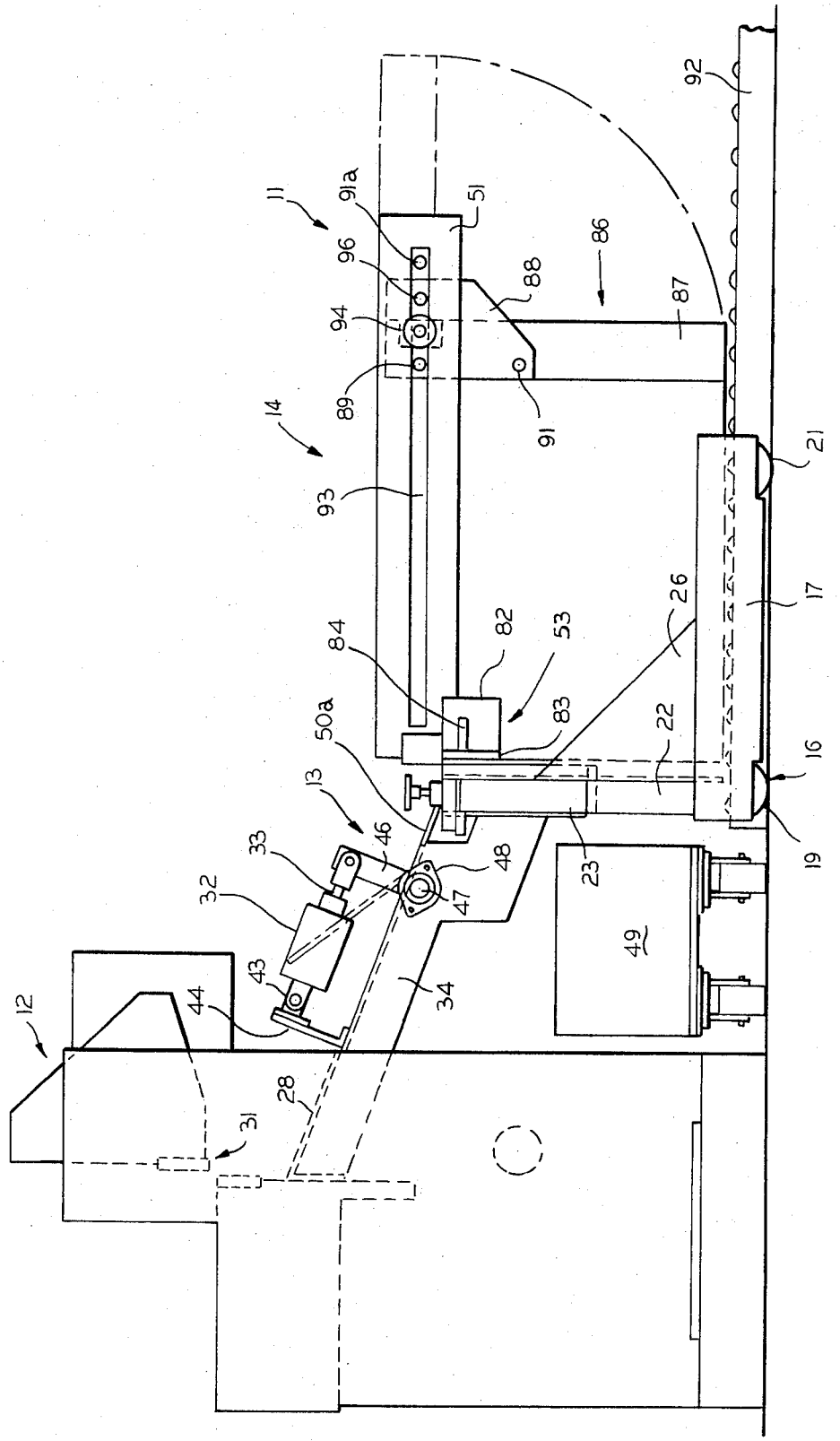
FIG. 1 is a side view of the inventive shear discharge conveying and stacking systems attached and in position at the rear of the shear.

The shear discharge light duty stacking assembly 11 is generally shown attached to a shear 12. The stacking assembly comprises a conveying portion 13 and a stacking portion 14. Common to both the stacker portion and the conveyor portion is the stacker rail assembly 16. The stacker rail assembly 16 comprises a pair of support cart frames 17 and 18, oppositely disposed from each other and each being mounted on casters, such as casters 19 and 21, shown in FIG. 1. Each of the support cart frames has a standard, such as standards 22, 22a extending vertically upward at the shear end thereof.

Attached to the vertical standards 22 22a is a stacker rail assembly 23. The stacker rail assembly 23 includes a rail extending from vertical standard 22 to vertical standard 22a on the support cart frame 18. The rail is attached by any well known means, such as by welding, to the standards. The vertical standards and the rail are supported on the support cart frames by brackets, such as angle brackets 26 and 27.

Extending toward the shear from the rail is the conveyor portion of the assembly 13. The conveyor portion comprises a shear mating or conforming plate 28 which rests against the table of the shear adjacent to its bottom knife blade so that the sheared piece parts fall from the knife blade onto the conforming plate 28. Bearing assemblies preferably are mounted in the plate 28 of the conveyor. These are schematically indicated by the small circles on plate 28, such as circle 29. Adjacent to the plate 28 is the scrap discriminator plate 30. When the scrap discriminator plate is in its normal position, the piece parts sheared by blade 31 of the shear fall onto plate 28, and from there slide down to the plate 30.

Means are provided for discriminating between scrap pieces and sheared piece parts. This means includes the fluid cylinder 32 having an extensible piston 33 at one end thereof. The cylinder 32 is mounted to the conveyor frame which includes frame plate 34 and oppositely disposed frame plate 35.

The shear mating or conforming plate 28, as well as the discriminator plate, rests on and is attached to the frame plates 34 and 35. The frame plates 34 and 35 are shown as being substantially boot shaped. The foot portions of the boot shaped frames abuts the rail 23. This is shown in FIG. 2 at 37 and 38. The actual attachement of the frame plates to the rail 23 can be by any well known means, such as welding or through the use of threaded fasteners.

Means are provided for moving the discriminator plate 30 to a scrap collecting position. More particularly, the cylinder 32 is shown attached to the rail through the use of a cylinder attaching bracket 43 and an L-shaped bracket 44. The bracket 43 and the L-shaped bracket 44 are connected to each other and to rail 34 through any well known means, such as by welding or the like. The brackets hold the cylinder 32 so that its piston operates lever 46. When lever 46 is normal to the top surface of the frame plates 34, 35, then the discriminator plate 30 is in its normal, biased position resting against the frame plates 34, 35. When the cylinder 32 is actuated so that the piston 33 is extended, then the lever 46 moves to rotate plate 30 around axle 47, to thereby raise plate 30 and enable scrap material to drop from plate 28 into a scrap collecting cart 48. The axle 47 is rotatingly coupled through the frame plates 34 and 35. Bearing means, such as bearing 48 may be used to facilitate the rotation of the plate 29 to the upraised position, shown in dotted lines in FIG. 1.

Front stops 50a, 50b extend from horizontal rail 23 to discriminator plate 30. The front stops are attached to the rail in any well known manner. As many front stops as are needed for the particular sized piece parts are used to bridge the space between the conveyor and the stacks. The stacker assembly 14 comprises side plates 51 and 52. Means are provided for adjusting the distance between the side plates, and, in general, the position of the side plates 51 and 52 relative to the width of the back of the shear. More particularly, the means for positioning the stacks comprises saddle rail assemblies 53 and 54. The saddle rail assemblies are mobile clamping arrangements that slide along the rail. The saddle rail assembly, such as assembly 53, comprises a carrier plate 55 which extends above and below the tops of the rail unit 23. A top plate 56 is connected to the carrier plate 55 by any well known means, such as threaded rod 57 which extends into threaded holes in plate 56. Bearing means, such as cameral bearing 58 and spacer 59 are rotatably mounted on a non-threaded portion of rod 57. A Flex lock nut 61, threaded onto rod 57 attached the bearing 58 and plate 56 to plate 55. Such bearing means are provided on both sides of saddle top plate 56 and are contiguous to rail 23.

At the rear of the top plate 56 and depending downward therefrom is spacer 62, and another cameral bearing 63, rotatably mounted on threaded rod 64. The rod threads into top plate 56 so as to provide a grip sufficiently far down on rail 23 to reliably hold the saddle rail assembly on the rail. A spacer 65 and Flex lock nut retain the bearing assembly in place. The limitaton on the distance down is, of course, the dimensions of side rails 34 and 35, and more particularly, of those portions of the side rails 41 and 42 that abut rail 23 to connect the side rails thereto.

The saddle rail assembly 53 is pushed along the rail to a desired location. Then clamping screw 67 is operated by turning handle 68 until the screw reaches through threaded bushing 69 and abuts the top of rail 23 to lift the saddle rail assembly 53 until clamp rack 71 abuts rack rail 72 to lockingly secure the saddle rail assembly at the desired location.

Means are provided at the bottom of the front plate 55 to implement moving the saddle rail assembly 53. More particularly, an additional cameral bearing 73 is attached at the bottom of the front plate 55. A threaded rod 74 threads into a threaded opening not shown at the bottom of the front plate. The bearing 73 is held in place by spacers 76 and 77 mounted on each side of the bearing. Spacer 76 is contiguous to the bottom plate 78. Bottom plate 78 has the rack 71 thereon.

A nut 79 secures the bearing, spacers and bottom plate in position.

Means are provided for mounting the side plates 51 and 52 to the saddle rail assemblies 53 and 54. More particularly, side plate mounting bracket assemblies, such as bracket assembly 81 are fixedly attached to both the side brackets and the front plate 55 of the saddle rail assembly using either fastener means or welding. The side plate mounting bracket assembly comprises a plate 82 that is fixedly secured to side plate 51 and plate 83 that is fixedly secured to front plate 55. Angle plate 84 is connected to and reinforces plates 82 and 83.

Means are provided for stopping the sheared material after it slides from the conveyor to the ground on rollers, such as roller 92. More particularly, back stops, such as 86 and 87 are provided slidingly attached to side plates 51 and 52, respectivly. In a preferred embodiment, the back stops, 86, 87 include angle beams having one flat side parallel with side plate 51 and the other flat side normal to side plate 51 and facing the back of the shear. A back stop adjusting and mounting plate 88 is provided.

Means are provided for retaining the back stop angle beam 87 in a position to stop sheared material or alternatively in a position to enable removing the stacks of sheared material. More particularly, an axle pin 89 passes through bracket 88 and beam 87. A position locking pin 91 also passes through bracket 88 and beam 87. When locking pin 91 is removed, the back stop angle beam 87 can be rotated around axle pin 89 until it is in the horizontal position shown by dashed lines at M. That position of the back stop enables the stack of sheared material to be rolled on the conveyor roller 92 and removed from the back of the shear.

The pin 91a passes through a groove 93 in the side plate 51 and into the hole an angle beam 87. In its horizontal position this locks the angle beam into the horizontal position. When it is desired to reset the back stop 87 in the normal position, then pin 91a is removed from the groove and the beam 87 is allowed to resume its normal position. Pin 91 is then pressed through the aperture in plate 88 locking the angel beam into its normal position to act as back stop.

Means are provided for adjusting the position of the back stop relative to the back of the shear. More particularly, the groove 93 in the side plate 51 extends almost the entire length of the side plate. A clamp 94 is provided. The clamp passes through groove 93 and plate 88. When the clamp is loosened the plate with the axle pin 89 attached can be pushed along groove 93. An additional bearing pin 96 may be provided to implement the movement of the back stop along groove 93.

In operation the inventive light duty stacker arrangement is easily installed behind the shear and operates to sort scrap parts from sheared material. The scraps are automatically dropped into a scrap bin 49 while the sheared material is automatically stacked on conveyors for ready removal. No motorized chains are necessary to move the sheared piece parts on the conveyor; instead the force of gravity is used.

While the principles of the invention have been described above in connection with the specific apparatus and applications, it is to be understood that this description is made only by way of example, and not as a limitation on the scope of the invention.

I claim:

1. A light duty stacking assembly for use in conjunction with shears,
   said assembly comprising a conveyor portion for transporting material from the shears,
   a stacking portion for use in stacking the transported material,
   non-motorized means on said conveyor portion for moving the material from the shear to the stacking portion,
   a stacker rail assembly common to both said stacker portion and said conveyor portion,
   said stacker rail assebly comprising a pair of support cart frames oppositely disposed from each other,
   standards on each of said support frames extending vertically upwardly at the shear end of said support cart frames,
   stacker rail means extending between said standards,
   means for attaching said conveyor to said rail,
   back stop means for stopping the sheared material after it slides from the conveyor,
   said back stop means including angle beam means,
   side plates for supporting said angle beam means,
   means for attaching said side plates to said rail means for supporting said side plates, and
   means for enabling said back stop to rotate from a vertical position to a horizontal position.

2. The light duty stacking assembly of claim 1 wherein means are provided for adjusting the position of the back stop relative to the back of the shear.

3. The light duty stacking assembly of claim 2 wherein said position adjusting means comprises a groove in each of the side plates, and
   means for clamping said back stop to a selected position in said groove.

4. A light duty stacking assembly for use in conjunction with shears,
   said assembly comprising a conveyor portion for transporting material from the shears,
   a stacking portion for use in stacking the transported material,
   said conveyor portion comprising a conveyor biased downwardly from said shear to said stacking portion, whereby said sheared material slides from said shear to said stacking portion,
   said stacking portion comprising back stop means for stopping the sheared material after it slides from said conveyor portion,
   said back stop means having a vertical position and a horizontal position and being in the vertical position when stopping the sheared material, and
   means for enabling said back stop means to rotate from the vertical position to the horizontal position wherein said stacked sheared material is available for removal.

5. The light duty stacking assembly of claim 4 wherein a stacker rail assembly is common to both said stacker portion and said conveyor portion,
   said stacker rail assembly comprising a pair of support cart frames oppositely disposed from each other,
   standards on each of said support frames extending vertically upwardly at the shear end of said support cart frames,
   stacker rail means extending between said standards, and
   means for attaching said conveyor to said rail.

6. The light duty stacking assembly of claim 5 wherein said conveyor portion comprises a shear conforming plate which is supported by the table of the shear adjacent to its bottom knife blade,
   conveyor frame plates oppositely disposed and supporting said conforming plate,
   scrap discriminator plate adjacent said conforming plate supported by said conveyor frame plates, and
   means for rotating said scrap discriminator plate around an axis parallel to the longitudinal dimension of said scrap discriminator plate.

\* \* \* \* \*